D. BOYD.
Churn-Dashers.

No. 145,985.        Patented Dec. 30, 1873.

Witnesses:        Inventor:
P. C. Dietrich        D. Boyd
Sedgwick        PER
       Attorneys.

UNITED STATES PATENT OFFICE.

DAVID BOYD, OF VEVAY, INDIANA.

IMPROVEMENT IN CHURN-DASHERS.

Specification forming part of Letters Patent No. 145,985, dated December 30, 1873; application filed August 25, 1873.

*To all whom it may concern:*

Figure 1:
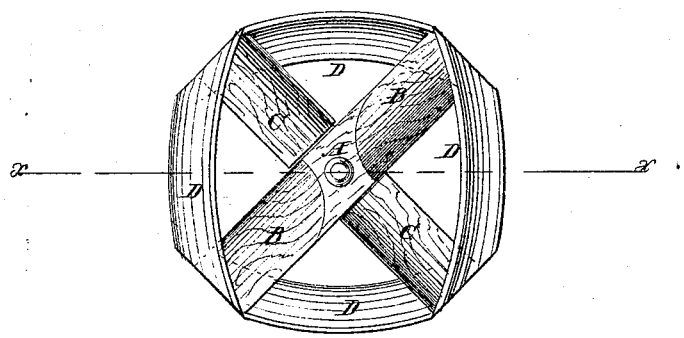
Figure 2:
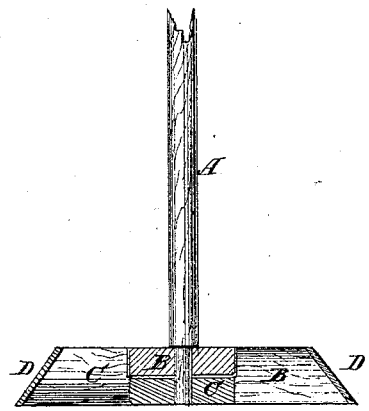

Be it known that I, DAVID BOYD, of Vevay, in the county of Switzerland and State of Indiana, have invented a new and useful Improvement in Churn-Dashers, of which the following is a specification:

Figure 1 is a top view of my improved dasher. Fig. 2 is a vertical cross-section of the same taken through the line $x\ x$ of Fig. 1.

My invention has for its object to furnish an improved churn-dasher simple in construction, easily operated, and effective in operation, bringing the butter in a very short time; and it consists in the dasher composed of two cross-bars and band, constructed and arranged in connection with each other, as hereinafter more fully described.

A is the dasher-handle, to the lower end of which is secured the centers of two cross-bars, B C, which are arranged at right angles with and are halved to each other, as shown in Figs. 1 and 2. The two arms or blades of each cross-bar B C are beveled in opposite directions, and the side cross-bars are so arranged that each two adjacent faces of the blades may both incline upward and from each other, or both incline downward and from each other. To the outer ends of the blades B C is attached a band, D, which is so formed that the part which is opposite the faces of the blades B C that incline upward may incline inward and upward, and the part that is opposite the faces of said blades that incline downward may incline downward and inward, as shown in Figs. 1 and 2.

By this construction, as the dasher moves either upward or downward, four strong currents of milk will be formed, two flowing outward toward the wall of the churn, and two flowing inward toward its center. The effect of this is to cause a great commotion in the milk, bringing the butter in a very short time. One, two, or more of the dashers B C D may be attached to the dasher-handle A, as may be desired, or as the size of the churn may render expedient.

Having thus described my invention, I claim as new and desire to secure by Letters Patent—

The rim D, with one opposite pair of faces inclined outwardly and the other pair inwardly, combined with the cross-bars B C, each reversely beveled on its opposite ends, as and for the purpose described.

DAVID BOYD.

Witnesses:
 WM. STEVENSON,
 B. A. STEVENSON.